(12) United States Patent
Mitchell et al.

(10) Patent No.: US 12,110,116 B1
(45) Date of Patent: Oct. 8, 2024

(54) PRE-HEATING AIRCRAFT ENGINE IN STANDBY MODE

(71) Applicant: Raytheon Technologies Corporation, Farmington, CT (US)

(72) Inventors: Ryan A. Mitchell, Jupiter, FL (US); Robert B. Fowler, West Palm Beach, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/217,228

(22) Filed: Jun. 30, 2023

(51) Int. Cl.
| | |
|---|---|
| *B64D 13/06* | (2006.01) |
| *B64D 13/08* | (2006.01) |
| *B64D 27/10* | (2006.01) |
| *F02C 3/13* | (2006.01) |
| *F02C 6/08* | (2006.01) |
| *F02C 6/18* | (2006.01) |
| *F02C 7/08* | (2006.01) |
| *F02C 9/42* | (2006.01) |
| *F02K 3/12* | (2006.01) |

(52) U.S. Cl.
CPC ............ *B64D 13/06* (2013.01); *B64D 13/08* (2013.01); *B64D 27/10* (2013.01); *F02C 3/13* (2013.01); *F02C 6/08* (2013.01); *F02C 6/18* (2013.01); *F02C 7/08* (2013.01); *F02C 9/42* (2013.01); *F02K 3/12* (2013.01)

(58) Field of Classification Search
CPC . B64D 13/06; B64D 13/08; F02C 6/08; F02C 6/18; F02C 3/13; F02C 9/42; F02K 3/12
See application file for complete search history.

(56) References Cited

U.S. PATENT DOCUMENTS

| | | | |
|---|---|---|---|
| 4,815,277 A | 3/1989 | Vershure, Jr. | |
| 7,624,592 B2 | 12/2009 | Lui | |
| 11,143,142 B2 | 10/2021 | Hanrahan | |
| 11,199,139 B2* | 12/2021 | Rajagopalan | .......... B64D 31/06 |
| 11,519,337 B2 | 12/2022 | Redford | |
| 2006/0237583 A1 | 10/2006 | Fucke | |
| 2015/0275769 A1* | 10/2015 | Foutch | .................... F02C 7/047 |
| | | | 60/776 |
| 2020/0056497 A1 | 2/2020 | Terwilliger | |
| 2022/0268207 A1* | 8/2022 | Joshi | ........................ F02C 6/08 |
| 2023/0085551 A1 | 3/2023 | Dussault | |

* cited by examiner

*Primary Examiner* — Kyle Robert Thomas
(74) *Attorney, Agent, or Firm* — Getz Balich LLC

(57) ABSTRACT

A method of operation is provided during which a heating fluid is directed through a first passage into a combustor section to heat a component within the combustor section when an aircraft engine is in a first standby mode. The aircraft engine includes a flowpath, a compressor section, the combustor section, a turbine section and an exhaust section. The flowpath extends through the compressor section, the combustor section, the turbine section and the exhaust section from an inlet into the flowpath to an exhaust from the flowpath. The heating fluid is directed through a second passage into the exhaust section when the aircraft engine is in a second mode. The heating fluid is directed through the second passage bypasses the turbine section.

19 Claims, 3 Drawing Sheets

PRE-HEATING AIRCRAFT ENGINE IN STANDBY MODE

BACKGROUND OF THE DISCLOSURE

1. Technical Field

This disclosure relates generally to an aircraft engine and, more particularly, to preparing the aircraft engine for a cold start.

2. Background Information

An aircraft engine such as an auxiliary power unit (APU) engine may need to be cold started at relatively high altitudes under adverse conditions. Various types of APU engines and APU engine cold start processes are known in the art. While these known APU engines and cold start processes have various benefits, there is still room in the art for improvement.

SUMMARY OF THE DISCLOSURE

According to an aspect of the present disclosure, a method of operation is provided during which a heating fluid is directed through a first passage into a combustor section to heat a component within the combustor section when an aircraft engine is in a first standby mode. The aircraft engine includes a flowpath, a compressor section, the combustor section, a turbine section and an exhaust section. The flowpath extends through the compressor section, the combustor section, the turbine section and the exhaust section from an inlet into the flowpath to an exhaust from the flowpath. The heating fluid is directed through a second passage into the exhaust section when the aircraft engine is in a second mode. The heating fluid is directed through the second passage bypasses the turbine section.

According to another aspect of the present disclosure, another method of operation is provided during which an aircraft engine in a standby mode is provided. The aircraft engine includes a flowpath, a compressor section, a combustor section and a turbine section. The flowpath extends through the compressor section, the combustor section and the turbine section from an inlet into the flowpath to an exhaust from the flowpath. A heating fluid is directed into the aircraft engine to heat a component within the combustor section while the aircraft engine is in the standby mode. A turbine rotor within the turbine section is substantially stationary during the standby mode.

According to still another aspect of the present disclosure, an aircraft system is provided that includes a heating fluid source, an aircraft engine and a fluid circuit. The aircraft engine includes a flowpath, a compressor section, a combustor section, a turbine section and an exhaust section. The flowpath extends through the compressor section, the combustor section, the turbine section and the exhaust section from an inlet into the flowpath to an exhaust from the flowpath. The fluid circuit is fluidly coupled with the heating fluid source. The fluid circuit includes a first passage, a second passage and a flow regulator. The first passage is fluidly coupled with the core flowpath along the combustor section. The second passage is fluidly coupled with the core flowpath along the exhaust section and bypasses the combustor section and the turbine section. The flow regulator is configured to: direct at least some of a heating fluid, received from the heating fluid source, through the first passage and into the combustor section to heat a component within the combustor section when the aircraft engine is in a first standby mode; and direct at least some of the heating fluid, received from the heating fluid source, through the second passage and into the exhaust section when the aircraft engine is in a second mode.

The aircraft system may also include an electric machine coupled to a turbine rotor within the turbine section. The electric machine may be configured to brake rotation of the turbine rotor during the first standby mode.

The heating fluid may be gas exhausted from an environmental control system of an aircraft.

The method may also include selectively diverting at least some of the heating fluid around the combustor section into the core flowpath downstream of the turbine section.

The second mode may be a second standby mode.

The heating fluid may be or otherwise include a gas at a temperature higher than a temperature of ambient air outside of the aircraft engine.

The heating fluid may be received from an aircraft environmental control system.

The heating fluid may be or otherwise include gas exhausted from the aircraft environmental control system.

The component may be configured as or otherwise include a combustor within the combustor section.

The heating fluid may be directed through the first passage and into the core flowpath within the combustor section during the first standby mode. The heating fluid may be directed through the second passage and into the core flowpath within the exhaust section during the second mode.

A turbine rotor within the turbine section may be substantially stationary during the first standby mode.

The method may also include braking rotation of a turbine rotor within the turbine section during the first standby mode.

The method may also include driving rotation of a turbine rotor within the turbine section with the heating fluid when the aircraft engine is in the first standby mode to mechanically power an electric machine to generate electricity.

The method may also include directing a second quantity of the heating fluid through the second passage into the exhaust section when the aircraft engine is in the first standby mode. The directing of the heating fluid through the first passage when the aircraft engine is in the first standby mode may include directing a first quantity of the heating fluid through the first passage into the combustor section.

None of the heating fluid may be directed through the second passage when the aircraft engine is in the first standby mode.

None of the heating fluid may be directed through the first passage when the aircraft engine is in the second mode.

The method may also include starting up the aircraft engine utilizing the component heated by the heating fluid.

A combustor within the combustor section may be non-operational when the aircraft engine is in the first standby mode.

The aircraft engine may be configured as or otherwise include an auxiliary power unit.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
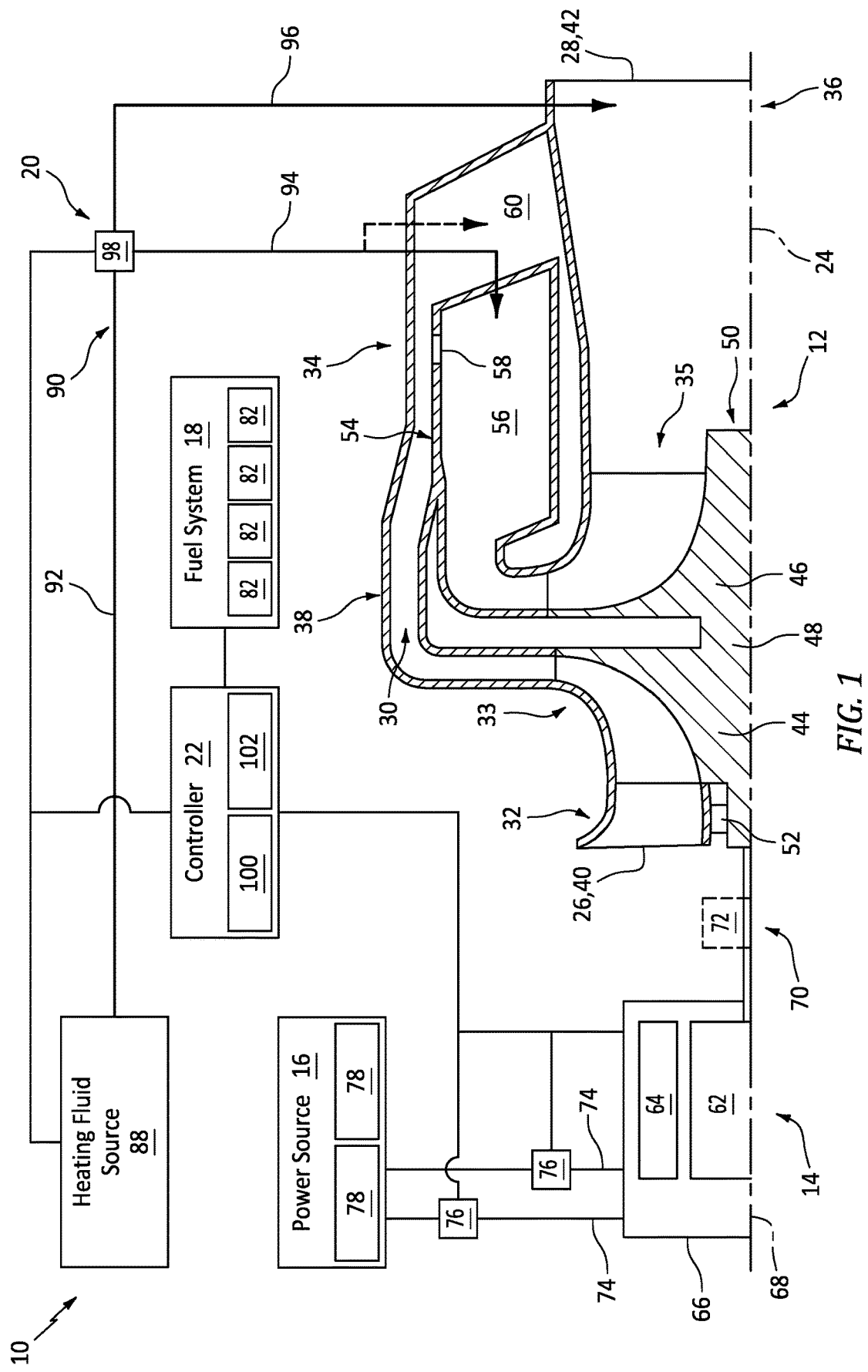
FIG. 1 is a partial schematic illustration of a system for an aircraft.

FIG. 1 illustrates a system 10 for an aircraft. The aircraft may be an airplane, a helicopter, a drone (e.g., an unmanned aerial vehicle (UAV)) or any other manned or unmanned aerial vehicle or system. The aircraft system 10 of FIG. 1 includes an aircraft engine 12 and an electric machine 14, where the aircraft engine 12 and the electric machine 14 may collectively form (or otherwise be included as parts of) an auxiliary power unit (APU) for the aircraft. The aircraft system 10 of FIG. 1 also includes a power source 16, a fuel system 18, an auxiliary fluid system 20 and a controller 22 for controlling operation of the aircraft system 10.

The aircraft engine 12 of FIG. 1 extends axially along an axial centerline 24 from a forward, upstream airflow inlet 26 into the aircraft engine 12 to an aft, downstream combustion products exhaust 28 from the aircraft engine 12. This axial centerline 24 may be a centerline axis and/or a rotational axis of the aircraft engine 12 and/or one or more components within the aircraft engine 12.

The aircraft engine 12 is configured as a heat engine such as a gas turbine engine. The aircraft engine 12 of FIG. 1, for example, includes a core flowpath 30, an inlet section 32, a compressor section 33, a (e.g., reverse flow) combustor section 34, a turbine section 35 and an exhaust section 36. At least (or only) the compressor section 33, the combustor section 34 and the turbine section 35 may form a core of the turbine engine. The aircraft engine 12 also includes a stationary structure 38 housing and/or forming one or more or all of the engine sections 32-36.

The core flowpath 30 extends within the aircraft engine 12 and its engine core from an airflow inlet 40 to the core flowpath 30 to a combustion products exhaust 42 from the core flowpath 30. More particularly, the core flowpath 30 of FIG. 1 extends sequentially through the inlet section 32, the compressor section 33, the combustor section 34 and the turbine section 35 to the exhaust section 36. The core inlet 40 may form the engine inlet 26 into the aircraft engine 12. The core exhaust 42 may form the engine exhaust 28 from the aircraft engine 12.

The compressor section 33 includes a bladed compressor rotor 44. The turbine section 35 includes a bladed turbine rotor 46. Each of these engine rotors 44, 46 includes a rotor base (e.g., a hub or a disk) and a plurality of rotor blades arranged circumferentially around and connected to the rotor base. The rotor blades, for example, may be formed integral with or mechanically fastened, welded, brazed and/or otherwise attached to the respective rotor base.

The compressor rotor 44 may be configured as a radial flow compressor rotor (e.g., an axial inflow-radial outflow compressor rotor), and the compressor section 33 may be configured as a radial flow compressor section. The turbine rotor 46 may be configured as a radial flow turbine rotor (e.g., a radial inflow-axial outflow turbine rotor), and the turbine section 35 may be configured as a radial flow turbine section. The compressor rotor 44 is connected to the turbine rotor 46 through an engine shaft 48. At least (or only) the compressor rotor 44, the turbine rotor 46 and the engine shaft 48 may collectively form an engine rotating assembly 50 (e.g., a spool) of the aircraft engine 12. This rotating assembly 50 and its engine shaft 48 are rotatably supported by the stationary structure 38 through one or more bearings 52 (one shown for ease of illustration); e.g., rolling element bearings, journal bearings, etc.

The combustor section 34 includes a combustor 54 (e.g., an annular combustor) with an internal combustion chamber 56 (e.g., an annular combustion chamber). The combustor 54 of FIG. 1 is configured as a reverse flow combustor. Inlets ports 58/flow tubes into the combustion chamber 56, for example, may be arranged at (e.g., on, adjacent or proximate) and/or towards an aft bulkhead wall of the combustor 54. An outlet from the combustor 54 may be arranged axially aft of an inlet to the turbine section 35. The combustor 54 may also be arranged radially outboard of and/or axially overlap at least a (e.g., aft) portion of the turbine section 35. With this arrangement, the core flowpath 30 of FIG. 1 reverses direction (e.g., from a forward-to-aft direction to an aft-to-forward direction) a first time as the core flowpath 30 extends from a diffuser plenum 60 surrounding the combustor 54 into the combustion chamber 56. The core flowpath 30 of FIG. 1 then reverses direction (e.g., from the aft-to-forward direction to the forward-to-aft direction) a second time as the core flowpath 30 extends from the combustion chamber 56 into the turbine section 35.

During a normal (e.g., power) mode operation of the aircraft engine 12, air enters the aircraft engine 12 through the inlet section 32 and its core inlet 40. The inlet section 32 directs the air from the core inlet 40 into the core flowpath 30 and the compressor section 33. The air entering the core flowpath 30 may be referred to as "core air". This core air is compressed by the compressor rotor 44. The compressed core air is directed through a diffuser and its diffuser plenum 60 into the combustion chamber 56. Fuel is injected and mixed with the compressed core air to provide a fuel-air mixture. This fuel-air mixture is ignited within the combustion chamber 56, and combustion products thereof flow through the turbine section 35 and cause the turbine rotor 46 to rotate. The rotation of the turbine rotor 46 drives rotation of the compressor rotor 44 and, thus, compression of the air received from the core inlet 40.

The electric machine 14 of FIG. 1 includes an electric machine rotor 62, an electric machine stator 64 and an electric machine housing 66. The machine rotor 62 is rotatable about a rotational axis 68 of the machine rotor 62. This rotational axis 68 may be an axial centerline of the electric machine 14, and the rotational axis 68 may be parallel (e.g., coaxial) with or offset from the axial centerline 24. The machine stator 64 of FIG. 1 is radially outboard of and circumscribes the machine rotor 62. With this arrangement, the electric machine 14 is configured as a radial flux electric machine. The electric machine 14 of the present disclosure, however, is not limited to such an exemplary rotor-stator configuration nor to radial flux arrangements. The machine rotor 62, for example, may alternatively be radially outboard of and circumscribe the machine stator 64. In another example, the machine rotor 62 may be axially next to the machine stator 64 configuring the electric machine 14 as an axial flux electric machine. Referring again to FIG. 1, the machine rotor 62 and the machine stator 64 are at least partially or completely housed within the machine housing 66.

The machine rotor 62 is coupled to and rotatable with the rotating assembly 50 through a drivetrain 70. This drivetrain 70 may be a direct drive drivetrain where, for example, the machine rotor 62 is coupled to the rotating assembly 50 through a driveshaft. With this arrangement, the machine rotor 62 and the rotating assembly 50 may rotate at a common (the same) rotational velocity. Alternatively, the drivetrain 70 may be an indirect drive drivetrain where, for example, an intermediate torque transmission device 72 (or system) couples the machine rotor 62 to the rotating assembly 50. Examples of the torque transmission device 72 include, but are not limited to, a geartrain (e.g., an epicyclic gear system) and a fluid transmission. With this arrangement, the machine rotor 62 and the rotating assembly 50 may rotate at different rotational velocities.

The electric machine 14 of FIG. 1 may be configurable as an electric generator and/or an electric motor. For example, during a generator mode of operation, the electric machine 14 may operate as the electric generator to convert mechanical power received from the aircraft engine 12 into electricity. The rotating assembly 50 and its turbine rotor 46, for example, may drive rotation of the machine rotor 62 through the drivetrain 70. The rotation of the machine rotor 62 may generate an electromagnetic field with the machine stator 64, and the machine stator 64 may convert energy from the electromagnetic field into the electricity. The electric machine 14 may then provide this electricity to the power source 16 for storage or further use. During a motor mode of operation, the electric machine 14 may operate as the electric motor to convert electricity received from the power source 16 into mechanical power. The machine stator 64, for example, may generate an electromagnetic field with the machine rotor 62 using the electricity. This electromagnetic field may drive rotation of the machine rotor 62. The machine rotor 62 may thereby drive rotation of the rotating assembly 50 through the drivetrain 70. This mechanical power may be provided to initially power the aircraft engine 12 during startup. The mechanical power may also be provided to brake rotation of the rotating assembly 50. Of course, in other embodiments, the electric machine 14 may alternatively be configured as a dedicated electric motor (e.g., without the electric generator functionality) or a dedicated electric generator (e.g., without the electric motor functionality).

The power source 16 is electrically coupled with the electric machine 14 through electrical circuitry; e.g., a power bus. This electrical circuitry may include one or more electrical leads 74 (e.g., high voltage lines) and one or more electrical devices 76 for conditioning, metering, regulating and/or otherwise controlling electrical power transfer between the electric machine 14 and the power source 16. Examples of the electrical devices 76 include, but are not limited to, switches, current regulators, converters and buffers.

The power source 16 is configured to store electricity. The power source 16 is also configured to provide the stored electricity to the electric machine 14 and/or receive electricity from the electric machine 14; e.g., during recharging. The power source 16, for example, may be configured as or otherwise include one or more electricity storage devices 78; e.g., batteries, etc.

Figure 2:
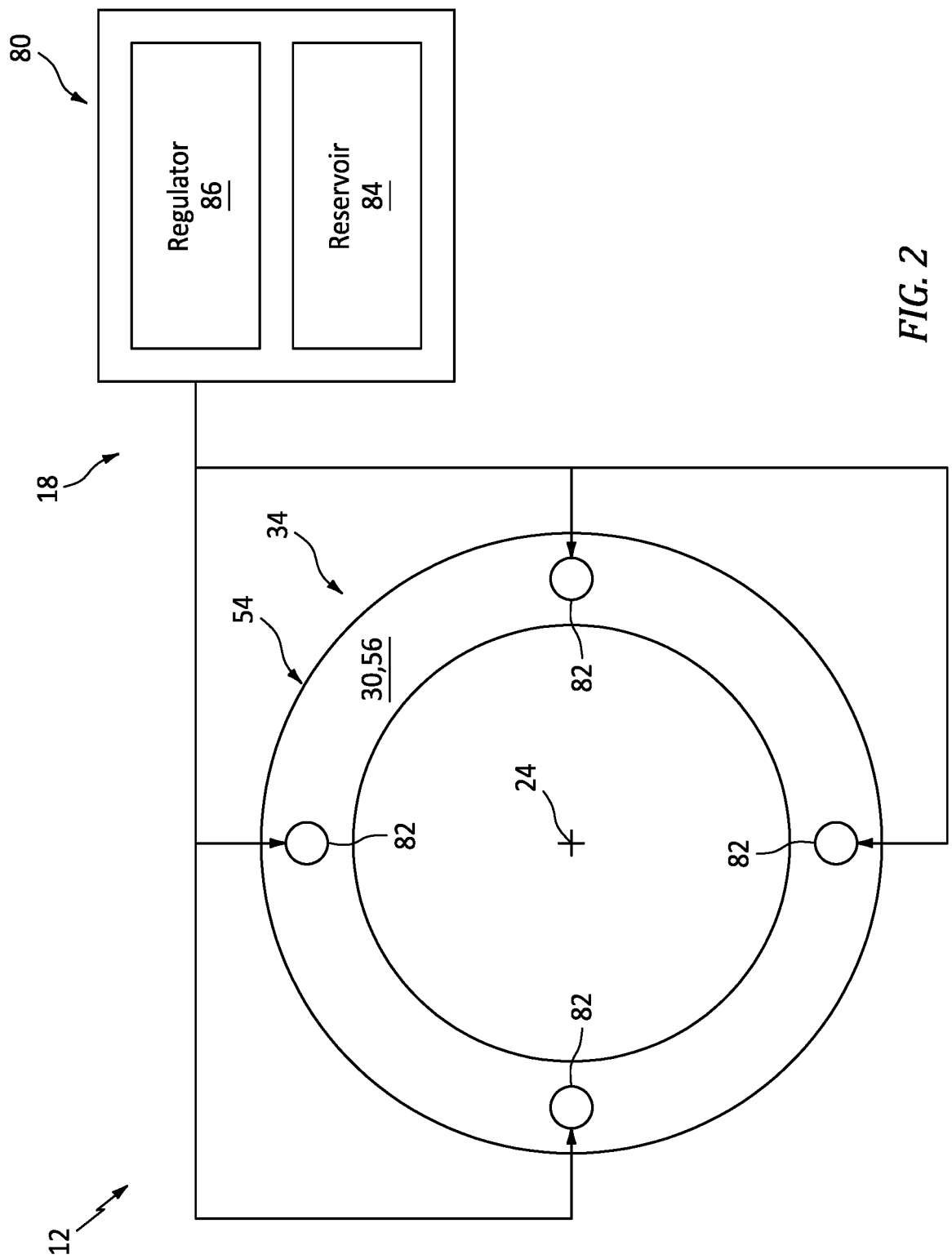
FIG. 2 is a schematic illustration of a fuel system with a combustor section of an aircraft engine.

Referring to FIG. 2, the fuel system 18 is configured to deliver the fuel to the aircraft engine 12. The fuel system 18 of FIG. 2 includes a fuel source 80 and one or more fuel injectors 82. The fuel source 80 includes a fuel reservoir 84 and/or a fuel flow regulator 86; e.g., a valve and/or a pump. The fuel reservoir 84 is configured to store the fuel before, during and/or after aircraft engine operation. The fuel reservoir 84, for example, may be configured as or otherwise include a tank, a cylinder, a pressure vessel, a bladder or any other type of fuel storage container. The fuel flow regulator 86 is configured to direct and/or meter a flow of the fuel from the fuel reservoir 84 to the fuel injectors 82. The fuel injectors 82 may be arranged circumferentially about the axial centerline 24 in an array. Each fuel injector 82 is configured to direct the fuel received from the fuel source 80 into the combustion chamber 56 for mixing with the compressed core air to provide the fuel-air mixture.

Referring to FIG. 1, the auxiliary fluid system 20 is configured to deliver a heating fluid to the aircraft engine 12 when, for example, the aircraft engine 12 is in a standby mode. For ease of description, the heating fluid is described below as heated, compressed air. This air may be waste air from another component or system of the aircraft. Alternatively, the air may be air bled from another component or system of the aircraft. The present disclosure, however, is not limited to heated, compressed air as the heating fluid. It is contemplated, for example, the heating fluid may alternatively be another gas contained and/or generated during aircraft operation; e.g., combustion products from another aircraft engine. Referring again to FIG. 1, the auxiliary fluid system 20 includes a heating fluid source 88 and a heating fluid circuit 90.

The heating fluid source 88 may be configured as any component or system onboard the aircraft which contains and/or otherwise generates the heating fluid. The heating fluid source 88, for example, may be configured as or otherwise include an environmental control system (e.g., a climate control system) for the aircraft and its cabin. This environmental control system is configured to direct conditioned air into the aircraft cabin, for example, to maintain air within the cabin at a select pressure, temperature and/or humidity. During operation, the environment control system may exhaust waste air (e.g., air not required for the aircraft cabin, air previously circulated through the aircraft cabin, etc.) as the heating fluid. Typically, this waste air (the heating fluid) may have a temperature and/or a pressure which is greater than a temperature and/or a pressure of ambient air outside the aircraft when the aircraft is inflight, particularly at high altitudes. Utilizing the environmental control system as the heating fluid source 88 may thereby facilitate recovery of energy from the waste air as described below in further detail. The present disclosure, however, is not limited to the foregoing exemplary heating fluid source configuration. The heating fluid source 88, for example, may alternatively be configured as another aircraft engine or aircraft system onboard the aircraft; e.g., a gas turbine engine of a propulsion system for the aircraft.

The heating fluid circuit 90 of FIG. 1 includes an input passage 92, one or more output passages 94 and 96 and a fluid flow regulator 98; e.g., a control valve. The input passage 92 fluidly couples and may extend between an output from the heating fluid source 88 and an input into the fluid flow regulator 98. The first output passage 94 fluidly couples and may extend between a first output from the fluid flow regulator 98 and an input into the combustor section 34. This combustor section input may be an input into the diffuser plenum 60, an input into the combustion chamber 56, or any other input fluidly coupled with the core flowpath 30 along the combustor section 34. The second output passage 96 fluidly couples and may extend between a second output from the fluid flow regulator 98 and an input into the exhaust section 36. This exhaust section input may be any input fluidly coupled with the core flowpath 30 along the exhaust section 36 (or otherwise downstream of the turbine rotor 46). With this arrangement, the heating fluid circuit 90 may direct the heating fluid through the second output passage 96 to bypass the combustor section 34 and the turbine section 35 of the aircraft engine 12. By contrast, heating fluid directed through the first output passage 94 enters the combustor section 34, and then may flow along the core flowpath 30 through the turbine section 35 and the exhaust section 36 to the core exhaust 42.

The fluid flow regulator 98 is configured to selectively fluidly couple the input passage 92 to one or both of the output passages 94 and 96. The fluid flow regulator 98 may thereby direct the heating fluid received from the heating fluid source 88 through the input passage 92 into one or both of the output passages 94 and 96. Of course, the fluid flow regulator 98 may also be configured to fluidly decouple the input passage 92 from one or both of the output passages 94 and 96.

The controller 22 is in signal communication with (e.g., hardwired and/or wirelessly coupled to) one or more members of the aircraft system 10; e.g., elements 14, 18, 76, 88 and/or 98. The controller 22 may be implemented with a combination of hardware and software. The hardware may include at least one processing device 100 and memory 102. The processing device 100 may include one or more single-core and/or multi-core processors. The hardware may also or alternatively include analog and/or digital circuitry other than that described above. The memory 102 is configured to store software (e.g., program instructions) for execution by the processing device 100, which software execution may control and/or facilitate performance of one or more operations such as those described herein. The memory 102 may be a non-transitory computer readable medium. For example, the memory 102 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EE-PROM), a computer hard drive, etc.

Figure 3:
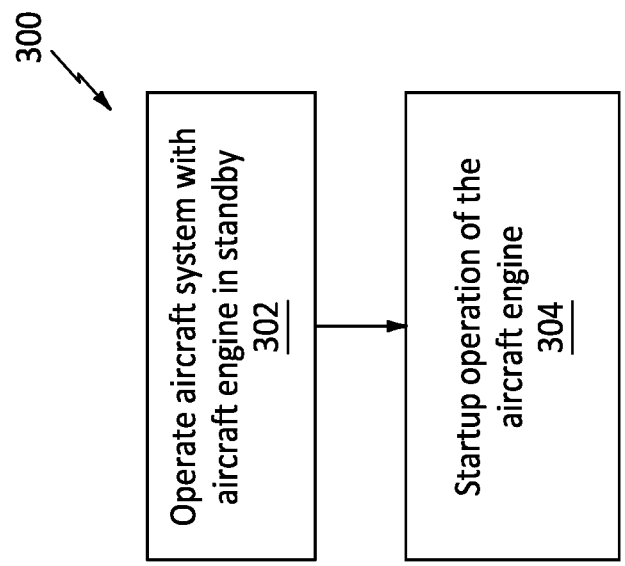
FIG. 3 is a flow diagram of a method of operation for an aircraft system.

FIG. 3 is a flow diagram of a method 300 of operation for an aircraft system. For ease of description, the operating method 300 is described below with respect to the aircraft system 10 described above. The operating method 300 of the present disclosure, however, is not limited to such an exemplary aircraft system. Moreover, the operating method 300 is described below with respect to operating the aircraft system 10 while the aircraft is in flight and at a relatively high altitude; e.g., at or above 10,000 feet. The operating method 300 of the present disclosure, however, may alternatively be performed at lower altitudes during aircraft flight and/or while the aircraft is on ground under certain conditions.

In step 302, the aircraft system 10 is operated with the aircraft engine 12 in standby. When the aircraft engine 12 is in standby, the aircraft engine 12 is non-operational; e.g., dormant, shutdown, turned-off, etc. In particular, while in standby, the fuel system 18 may be non-operational (or operated in such a fashion) such that none of the fuel is delivered by the fuel system 18 (e.g., or any other fuel system) to the aircraft engine 12 and its combustor section 34. The fuel therefore is not injected into the combustion chamber 56 for combustion, and combustion products are not generated for driving rotation of the turbine rotor 46. However, when the aircraft engine 12 is in standby, the aircraft system 10 prepares the aircraft engine 12 for future operation. For example, when the aircraft engine 12 is in standby, the aircraft system 10 may prepare the aircraft engine 12 for a relatively quick cold startup by pre-heating one or more components (e.g., 54, 82, etc.) of the aircraft engine 12.

In a first standby mode, the fluid flow regulator 98 directs a quantity of the heating fluid through the first output passage 94 to the combustor section 34 of the aircraft engine 12. This quantity of the heating fluid is directed into the core flowpath 30 within the combustor section 34. For example, the heating fluid may be directed into the diffuser plenum 60 and/or directly into the combustion chamber 56. The heating fluid may thereby heat (e.g., pre-heat for engine future startup) the combustor 54 and various other components within the combustor section 34 such as the fuel injectors 82. The heating fluid may then flow through the remainder of the core flowpath 30 (e.g., out of the combustor section 34 and through the turbine section 35 and the exhaust section 36) to be exhausted from the aircraft engine 12 through the core exhaust 42. Note, by introducing the heating fluid into the core flowpath 30 at the combustor section 34, the heating fluid may bypass (e.g., not flow through) the inlet section 32 and the compressor section 33.

During the first standby mode, the fluid flow regulator 98 may selectively divert some of the heating fluid received from the heating fluid source 88 into the second output passage 96. For example, the fluid flow regulator 98 may be operated to maintain a uniform (e.g., constant) flow of the heating fluid into the first output passage 94 for heating the combustor section components (e.g., 54 and/or 82). Thus, if a quantity of the heating fluid received from the heating fluid source 88 increases, some (or more) of the heating fluid may be diverted into the second output passage 96. However, if the quantity of the heating fluid received from the heating fluid source 88 decreases, less (or none) of the heating fluid may be diverted into the second output passage 96. In another example, the fluid flow regulator 98 may be operated to vary the flow of the heating fluid into the first output passage 94 for heating the combustor section components (e.g., 54 and/or 82) based on various (e.g., environmental and/or operational) parameters; e.g., current ambient conditions, current temperature of the combustor section components (e.g., 54 and/or 82), etc. The flow of the heating fluid, for example, may be varied to accommodate changing heating needs of the aircraft engine 12 and its combustor section components (e.g., 54 and/or 82) based on changes in the parameters. Thus, the quantity of the heating fluid diverted into the second output passage 96 may be varied such that the remaining flow of the heating fluid into the first output passage 94 satisfies the changing heating needs of the aircraft engine 12 and its combustor section components (e.g., 54 and/or 82). Of course, in other embodiments, it is contemplated that none of the heating fluid is diverted to the second output passage 96 during the first standby mode. The quantity of the heating fluid directed into the first output passage 94, however, may still be metered by the fluid flow regulator 98 to satisfy the heating needs.

In a second standby mode, the fluid flow regulator 98 directs a quantity of the heating fluid through the second output passage 96 to the exhaust section 36 of the aircraft engine 12. This quantity of the heating fluid is directed into the core flowpath 30 within the exhaust section 36, or otherwise downstream of the turbine rotor 46 along the core flowpath 30. The heating fluid may thereby be exhausted from the heating fluid circuit 90 without flowing into the combustor section 34 or the turbine section 35. This second standby mode may be selected when the combustor section components (e.g., 54 and/or 82) are already at or above a threshold temperature for cold start. During the second standby mode, none of the heating fluid received from the heating fluid source 88 may be provided to the first output passage 94.

During aircraft engine standby (e.g., during the first and/or the second standby modes), the quantity of the heating fluid directed (e.g., metered) by the fluid flow regulator 98 into the combustor section 34 through the first output passage 94 may be relatively small. This small quantity of the heating fluid may then trickle (e.g., flow slowly) out of the combustor section 34 and through the remainder of the core flowpath 30 to the core exhaust 42. By trickling the heating fluid through the turbine section 35 and across the turbine rotor 46, it is contemplated the flow of the heating fluid may be small enough so as not to drive rotation of the turbine rotor 46. By preventing or reducing rotation of the turbine rotor 46, the aircraft system 10 may prevent or reduce wear of the rotating assembly 50 and/or its bearings 52 during aircraft engine standby. In addition or alternatively, the electric machine 14 may be operated as a brake for the rotating assembly 50. An electrical current, for example, may be directed to the machine stator 64, and the electric machine 14 may be operated as the electric motor. The electrical current may be metered such that the electric machine 14 counteracts any fluid driving force imparted onto the turbine rotor 46 by the heating fluid. The electric machine 14 may thereby actively brake (e.g., slow and/or prevent) rotation of the rotating assembly 50 and its turbine rotor 46. By using the electric machine 14 as a brake, the quantity of the heating fluid directed into the combustor section 34 may be (e.g., significantly) increased to increase heating of the combustor section components (e.g., 54 and/or 82) while still preventing or reducing rotation of the turbine rotor 46.

In other embodiments, the rotating assembly 50 and its turbine rotor 46 may be permitted to rotate. The heating fluid used for heating the combustor section components (e.g., 54 and/or 82), for example, may also be used to subsequently drive rotation of the turbine rotor 46. This heating fluid may thereby power operation of the electric machine 14 as the electric generator to generate electricity. With this arrangement, the aircraft system 10 may recover both heat energy via the heating as well as fluid energy via the turning of the turbine rotor 46 from the heating fluid received from the heating fluid source 88; e.g., the waste air from the aircraft environmental control system. When the heating fluid is also used for driving rotation of the turbine rotor 46, the selection and/or the operation of the first and the second standby modes may also or alternatively be performed based on aircraft electrical power needs.

In step 304, the aircraft engine 12 is started for the normal operation described above. The starting of the aircraft engine 12 may be performed relatively quickly given the preheating of the combustor section components (e.g., 54 and/or 82) with the heating fluid during the step 302. Moreover, the fluid flow regulator 98 may increase (or maintain) the flow of the heating fluid into the aircraft engine 12 through the first output passage 94 during the starting of the aircraft engine 12. The heating fluid may thereby be used to help spool up rotation of the rotating assembly 50 by driving rotation of the turbine rotor 46. The heating fluid may also or alternatively be used to supply, for example, compressed air into the combustion chamber 56 for mixing with the fuel (e.g., prior to receiving full compressed air from the compressor section 33). Alternatively, the fluid flow regulator 98 may divert some or all of the heating fluid into the second output passage 96 to bypass the combustor section 34. Still alternatively, the fluid flow regulator 98 may stop the flow of the heating fluid into the aircraft engine 12. The flow of the heating fluid into the first output passage 94 and/or the second output passage 96 may be decreased or stopped prior to performance of the startup step 304, during performance of the startup step 304, or following performance of the startup step 304.

In addition to the foregoing, by heating the combustor section components (e.g., 54 and/or 82) during standby prior to aircraft engine startup, those components may be subject to a reduced transient temperature swing upon startup of the aircraft engine 12; e.g., particularly at high altitudes where the ambient air temperature is relatively low. Large rapid changes in engine component temperatures may result in varying thermal growth since different engine components are made from different materials and/or may be subject to different environmental parameters. Maintaining the aircraft engine 12 (e.g., its components 54 and/or 82) at a warmer temperature may reduce temperature gradients during startup of the aircraft engine 12 in a cold temperature environment; e.g., at high altitudes.

While the system 10 is described above with respect to an aircraft application, the present disclosure is not limited thereto. For example, it is contemplated the system 10 may alternatively be utilized for non-aircraft applications; e.g., for a (e.g., supplemental) land-based power generation system which (e.g., only or primarily) operates during peak demand.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
   directing a heating fluid through a first passage into a combustor section to heat a component within the combustor section when an aircraft engine is in a first standby mode, the aircraft engine including a flowpath, a compressor section, the combustor section, a turbine section and an exhaust section, and the flowpath extending through the compressor section, the combustor section, the turbine section and the exhaust section from an inlet into the flowpath to an exhaust from the flowpath; and
   directing the heating fluid through a second passage into the exhaust section when the aircraft engine is in a second mode, wherein the heating fluid directed through the second passage bypasses the turbine section;
   wherein the heating fluid is received from an aircraft environmental control system.

2. The method of claim 1, wherein the heating fluid comprises a gas at a temperature higher than a temperature of ambient air outside of the aircraft engine.

3. The method of claim 1, wherein the heating fluid is gas exhausted from the aircraft environmental control system.

4. The method of claim 3, wherein the component comprises a combustor within the combustor section.

5. The method of claim 4, wherein
   the heating fluid is directed through the first passage and into the core flowpath within the combustor section during the first standby mode; and the heating fluid is directed through the second passage and into the core flowpath within the exhaust section during the second mode.

6. The method of claim 3, wherein a turbine rotor within the turbine section is substantially stationary during the first standby mode.

7. The method of claim 3, further comprising braking rotation of a turbine rotor within the turbine section during the first standby mode.

8. The method of claim 3, further comprising driving rotation of a turbine rotor within the turbine section with the heating fluid when the aircraft engine is in the first standby mode to mechanically power an electric machine to generate electricity.

9. The method of claim 3, further comprising:
directing a second quantity of the heating fluid through the second passage into the exhaust section when the aircraft engine is in the first standby mode;
wherein the directing of the heating fluid through the first passage when the aircraft engine is in the first standby mode comprises directing a first quantity of the heating fluid through the first passage into the combustor section.

10. The method of claim 3, wherein none of the heating fluid is directed through the second passage when the aircraft engine is in the first standby mode.

11. The method of claim 3, wherein none of the heating fluid is directed through the first passage when the aircraft engine is in the second mode.

12. The method of claim 3, further comprising starting up the aircraft engine utilizing the component heated by the heating fluid.

13. The method of claim 3, wherein a combustor within the combustor section is non-operational when the aircraft engine is in the first standby mode.

14. The method of claim 3, wherein the aircraft engine comprises an auxiliary power unit.

15. A method of operation, comprising:
providing an aircraft engine in a standby mode, the aircraft engine including a flowpath, a compressor section, a combustor section and a turbine section, and the flowpath extending through the compressor section, the combustor section and the turbine section from an inlet into the flowpath to an exhaust from the flowpath; and
directing a heating fluid into the aircraft engine to heat a component within the combustor section while the aircraft engine is in the standby mode, wherein a turbine rotor within the turbine section is substantially stationary during the standby mode, and wherein the heating fluid is received from an environmental control system of an aircraft.

16. The method of claim 15, wherein the heating fluid received from the environmental control system is gas exhausted from the environmental control system.

17. The method of claim 15, further comprising selectively diverting at least some of the heating fluid around the combustor section into the core flowpath downstream of the turbine section.

18. An aircraft system, comprising:
an environmental control system;
an aircraft engine including a flowpath, a compressor section, a combustor section, a turbine section and an exhaust section, and the flowpath extending through the compressor section, the combustor section, the turbine section and the exhaust section from an inlet into the flowpath to an exhaust from the flowpath; and
a fluid circuit fluidly coupled with the environmental control system, the fluid circuit including a first passage, a second passage and a flow regulator, the first passage fluidly coupled with the core flowpath along the combustor section, the second passage fluidly coupled with the core flowpath along the exhaust section and bypassing the combustor section and the turbine section, and the flow regulator configured to
direct at least some of a heating fluid, received from the environmental control system, through the first passage and into the combustor section to heat a component within the combustor section when the aircraft engine is in a first standby mode; and
direct at least some of the heating fluid, received from the environmental control system, through the second passage and into the exhaust section when the aircraft engine is in a second mode.

19. The aircraft system of claim 18, further comprising:
an electric machine coupled to a turbine rotor within the turbine section;
the electric machine configured to brake rotation of the turbine rotor during the first standby mode.

* * * * *